United States Patent [19]
Schneider et al.

[11] Patent Number: 5,906,263
[45] Date of Patent: May 25, 1999

[54] MONITORING APPARATUS FOR A TRANSPORTING SYSTEM

[75] Inventors: Ralph Schneider, Waiblingen; Karl Hinderer, Erdmannhausen, both of Germany

[73] Assignee: Robert Bosch GmbH, Stuttgart-Feuerbach, Germany

[21] Appl. No.: 08/842,112

[22] Filed: Apr. 28, 1997

[30] Foreign Application Priority Data

Apr. 27, 1996 [DE] Germany .......................... 196 16 696

[51] Int. Cl.⁶ ................................................. B65G 47/00
[52] U.S. Cl. ............................... 198/345.3; 198/341.05; 198/341.07
[58] Field of Search ........................... 198/345.3, 341.07, 198/464.2, 357, 341.03, 341.05, 358, 502.3

[56] References Cited

U.S. PATENT DOCUMENTS

| | | | |
|---|---|---|---|
| 3,310,150 | 3/1967 | Southard | 198/464.2 |
| 3,527,087 | 9/1970 | Converse et al. | 198/345.3 |
| 5,002,175 | 3/1991 | Drexel et al. | 198/345.3 |

*Primary Examiner*—Joseph E. Valenza
*Attorney, Agent, or Firm*—Venable; George H. Spencer; Gabor J. Kelemen

[57] ABSTRACT

A transporting system includes a conveyor; a workpiece carrier adapted to be advanced by the conveyor; and a monitoring apparatus for monitoring a presence or absence of the workpiece carrier in a predetermined zone of the conveyor. The monitoring apparatus has a switching element supported adjacent the conveyor and projecting at least partially into a path of the conveyor; and an arrangement for actuating the switching element independently of a direction of conveyance of the workpiece carrier.

13 Claims, 3 Drawing Sheets

5,906,263

MONITORING APPARATUS FOR A TRANSPORTING SYSTEM

CROSS REFERENCE TO RELATED APPLICATION

This application claims the priority of German Application No. 196 16 696.9 filed Apr. 27, 1996, which is incorporated herein by reference.

BACKGROUND OF THE INVENTION

This invention relates to a monitoring apparatus of a transport system which has a conveyor for a workpiece carrier adapted to accommodate components or component groups. The monitoring apparatus serves for determining the absence or presence of the workpiece carrier in a region of the conveyor.

The above-outlined conventional monitoring apparatus is used particularly in a transporting system in which an incoming and an outgoing conveyor abut one another at right angles and at the transfer location means are provided for detecting the presence or absence of the workpiece carrier.

At the transfer location a first signal transmitter of the monitoring apparatus is arranged which responds to a collision of a workpiece carrier with a stationary stop. The first signal transmitter is positioned at the transfer location. As long as such a signal is present, a separating element which is situated upstream of the transfer location as viewed in the conveying direction is in a stop position so that further workpiece carriers are prevented access to the transfer location. As soon as the workpiece carrier is fed into the transfer location, the first signal transmitter is deactivated. At the same time, a second signal transmitter of the monitoring apparatus is activated which monitors the departure of the workpiece carrier from the transfer location. As long as the second signal transmitter is active, the separating element continues to remain in a stop position. The separating element is switched into a let-through position only after the workpiece carrier has completely left the transfer location and the first signal transmitter and the second signal transmitter no longer detect the presence of the workpiece carrier, so that a subsequent workpiece carrier again may be moved into the transfer location.

SUMMARY OF THE INVENTION

It is an object of the invention to provide an improved monitoring apparatus of the above-outlined type having a significantly simplified construction.

This object and others to become apparent as the specification progresses, are accomplished by the invention, according to which, briefly stated, the transporting system includes a conveyor; a workpiece carrier adapted to be advanced by the conveyor; and a monitoring apparatus for monitoring a presence or absence of the workpiece carrier in a predetermined zone of the conveyor. The monitoring apparatus has a switching element supported adjacent the conveyor and projecting at least partially into a path of the conveyor; and an arrangement for actuating the switching element independently of a direction of conveyance of the workpiece carrier.

The monitoring apparatus of a transporting system according to the invention has thus the advantage over prior art constructions that it is feasible to monitor the transfer location with a sole apparatus to determine the presence or absence of a workpiece carrier.

In this manner, the monitoring of the transfer location may be reduced to a single signal transmitter whereby significant cost and time saving may achieved in the assembly and control of the apparatus.

The monitoring apparatus which may be actuated independently of the conveying direction of the workpiece carrier, may thus detect the presence of a workpiece carrier in the transfer location and may also detect its departure from the transfer location. Furthermore, the monitoring apparatus according to the invention may form, at the same time, a stop for the workpiece carrier arriving in the transfer location. The monitoring apparatus according to the invention may be positioned externally of a transfer location, whereby a zone of the conveyor may be monitored.

According to an advantageous feature of the invention, the monitoring device comprises a switching element rotatably and/or linearly displaceably guided in a housing in the transporting plane of the workpiece carrier. In this manner a simple structural embodiment is obtained and a simple operation of the switching element by the workpiece carrier is achieved for detecting the presence of a workpiece carrier in the zone to be monitored. The switching element remains actuated until the workpiece carrier has entirely passed over or left the switching element; this makes possible a regional monitoring.

Further, the switching element of the monitoring apparatus has advantageously at least one run-up ramp oriented partially opposite a transporting direction of the workpiece carrier. By means of this arrangement, a smooth, disturbance-free transport of the workpiece carrier is ensured because an edge of the workpiece carrier body oriented in the transporting direction first engages the run-up ramp and passes thereover, whereby the switching element is movable from a position of rest into a switching position for detecting the presence of a workpiece carrier.

According to a further advantageous feature of the monitoring apparatus according to the invention, a resetting means is provided which works against the actuating direction of the switching element. In this manner, in case of an absence of the workpiece carrier the switching element may be moved automatically into a position of rest whereby a signal transmitter disposed in the housing of the monitoring apparatus is not actuated and the absence of a workpiece carrier may be detected.

According to a further advantageous feature of the invention a particular guidance of the switching element in the housing is provided. Preferably, the switching element has two openings which are spaced from the central axis of the switching element and extend parallel thereto and which receive cylindrical pins that are fixedly secured to the housing. By virtue of this arrangement it is feasible to detect a workpiece carrier which runs up on the switching element in the operating direction in the monitoring range or to detect a workpiece carrier which moves onto the switching element transversely to the operating direction. In case of a workpiece carrier which is moved transversely to the operating direction of the switching element on the transporting path, the switching element, by means of the openings which are preferably slots, may execute first a slight rotary motion and subsequently may be moved entirely in the operating direction into a switching position.

DESCRIPTION OF THE PREFERRED EMBODIMENT

Figure 1:
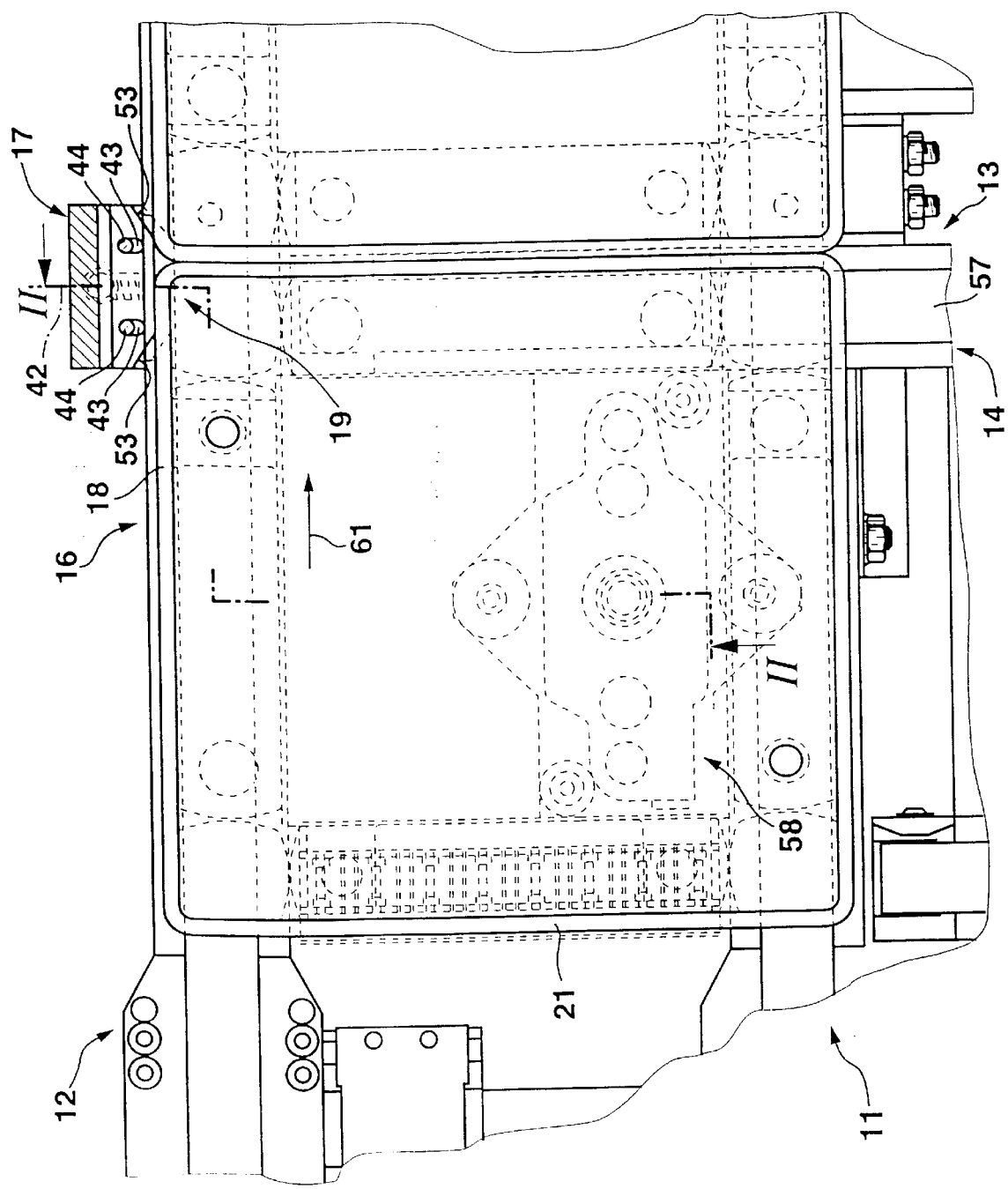
FIG. 1 is a top plan view of a transporting system incorporating a preferred embodiment of a monitoring apparatus according to the invention.

FIG. 1 shows a portion of a transporting system 11 which is part of a modular production line. The transporting system has a main circulating track, shown in part as a main conveyor 12. The main circulating track further has a return transporting portion. Separate, non-illustrated deflecting modules are provided at both ends of the supply or main conveyor track and the return transporting portion. The main conveyor 12, as well as the return transport portion may be formed of several conveyor section modules.

In the present embodiment the transport system 11 is a dual belt conveyor where, for example, each section module has its own drive for the conveyor belts. It is feasible, however, to utilize other types of transport systems. Along the main conveyor 12 a lateral supply section is arranged which is associated, for example, with a work station. Such a lateral supply section is typically represented by a feed-in module 13 which is disposed perpendicularly to the main conveyor 12 and which has a feed-in section 14. The main conveyor 12 and the feed-in section 14 form a transfer location 16, by means of which a workpiece carrier 21 which was deviated into a lateral supply section is fed to the main conveyor 12. The transfer location 16 is monitored by a monitoring apparatus 17 which is situated externally of an outer conveyor section 18 of the main conveyor 12, in an exit region 19 of the transfer location 16. By virtue of such an arrangement of the monitoring apparatus 17 relative to the transfer location 16, it is sufficient to utilize a single monitoring apparatus 17 to determine a presence or an absence of a workpiece carrier 21 at the transfer location 16, as it will be described in detail below.

Figure 2:
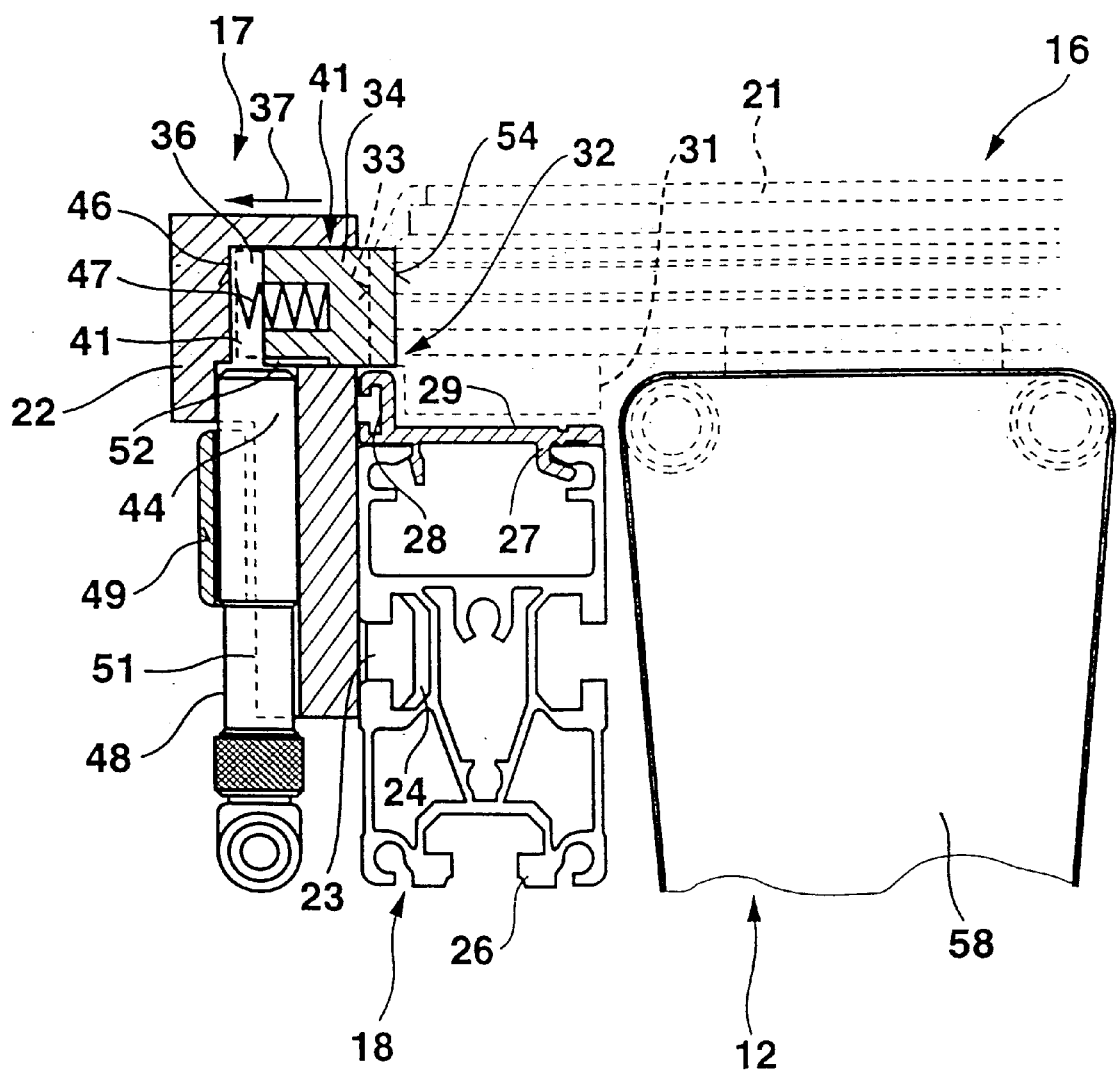
FIG. 2 is a schematic sectional view taken along line II—II of FIG. 1.

Turning to FIG. 2, the monitoring apparatus 17 has a housing 22 which is secured to the outer conveyor section 18 by means of a securing device 23 which preferably is a hammer head screw securable in a groove 24 of a profile element 26 of the outer conveyor section 18. The workpiece carrier 21 is guided on a workpiece carrier rail 27 which is clipped on a frontal side of the profile element 26. The workpiece carrier rail 27 has a guide strip 28 situated externally of the main conveyor 12 to guide the workpiece carrier 21 in the main conveyor 12. A non-illustrated inner conveyor section is similarly structured. A transporting belt 29 runs on the workpiece carrier rail 27 and moves the workpiece carrier 21 in the transporting direction. The workpiece carrier 21 has a foot 31 supported on the transport belt 29. The foot 31 is adjoined by a shoulder 32 of the workpiece carrier 21 whereby an external edge 33 is formed which partially surrounds the guide strip 28. By means of the external edge 33 of the workpiece carrier 21 a switching element 34 of the monitoring apparatus 17 is actuated.

The switching element 34 is floatingly (slidably) supported in a guide 36 of the housing 22 and may be moved out from a position of rest 38 shown in solid lines in the direction of the arrow 37 parallel to a transporting plane into a switching position 41 shown in dash-dot lines.

Figure 3:
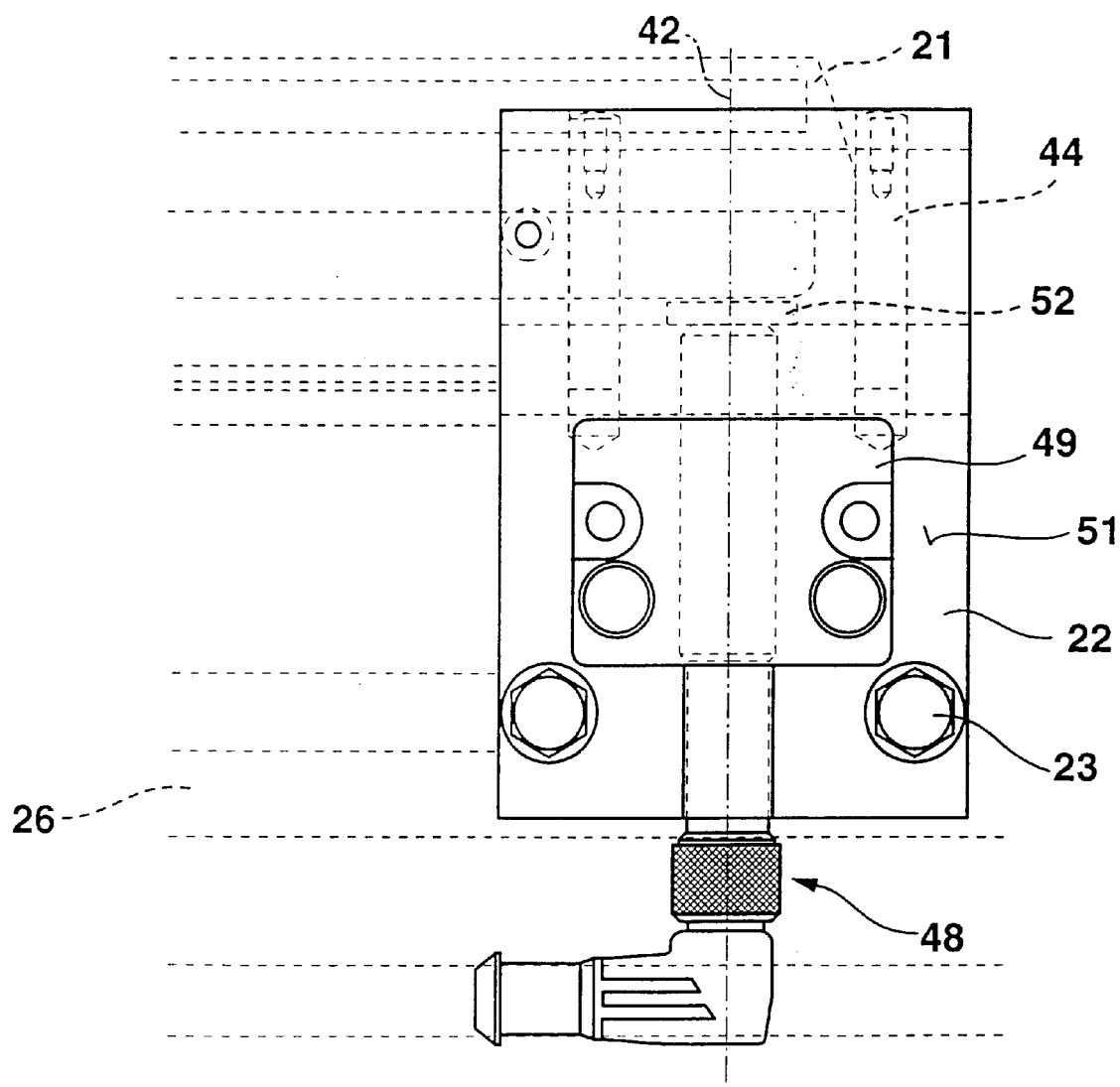
FIG. 3 is a schematic side elevational view of the preferred embodiment.

The housing 22 is a one-piece component made of a synthetic material. The guide 36 is a cross-sectionally rectangular groove which extends over the length of the housing 22 as shown in FIG. 3. The switching element 34 is a slide or plunger made of a synthetic material.

The switching element 34 has a central axis 42 parallel to the direction 37 and slots 43 spaced from the axis 42. The length of the slots 43 corresponds to at least one switching stroke of the switching element 34 between the position of rest 38 and the switching position 41. The slots 43 receive respective cylindrical pins 44 which are fixedly secured to the housing 22 and which may be inserted freely from above into the housing 22, ensuring a simple assembly. Between the switching element 34 and a rear wall 46 of the guide 36 a resetting means 47 is arranged by means of which the switching element 34 may be automatically positioned in the position of rest 38 in case of an absence of a workpiece carrier 21. The resetting means 47 is preferably a compression spring disposed in an axial alignment with the axis 42. It is to be understood, however, that elastically yielding spring elements may also be used.

A signal transmitter 48 is arranged perpendicularly to the direction of motion 37 of the switching element 34. The signal transmitter 48 is mounted on a housing wall 51 by means of a securing plate 49. The securing plate 49 is attached to the housing wall 51 by a screw connection so that the distance of the signal transmitter 48 from the switching element 34 is adjustable. The switching element 34 has, at its side oriented towards the signal transmitter 48, an expediently sprayed-on metal insert 52 which operates as a switching means. The signal transmitter 48 may be actuated when a small portion of its frontal face, for example, one third thereof, is in an overlapping relationship with the metal insert 52 to thus respond to the presence of a workpiece carrier 21.

The signal transmitter 48 is an inductive proximity switch so that in case of an excursion of the switching element 34 caused by an edge 33 of the workpiece carrier 21, the signal transmitter 48 is actuated and transmits a signal to a control device as soon as the signal transmitter 48 is in an at least partially overlapping relationship with the metal insert 52 of the switching element 34. In the alternative, the signal transmitter may be a capacitive, optical or mechanical signal transmitter in which case the switching element 34 is adapted to the alternative design of the signal transmitter 48.

The switching element 34 of the monitoring apparatus 17 has run-up ramps 53 oriented in and against the transporting direction of the workpiece carrier 21. By virtue of this arrangement, the monitoring apparatus 17 may be universally used independently from the direction of conveyance.

The switching element 34 is arranged in the position of rest 38 in such a manner that a switching face 54 thereof oriented towards the conveyor path overlaps at least the guide strip 28. Preferably, the switching face 54 projects into the transporting path to ensure that an external edge 33 of the workpiece carrier 21 actuates the switching face 54. The switching stroke of the switching element 34 is expediently 3–7 mm; the switching face 54 may project approximately 2 mm beyond the guide strip 28 in the transport section. The switching face 54 is at least so wide that the edge 33 of the workpiece carrier 21 may be actuated independently of its upper or lower position into which it is brought by a transversal stroke unit 58.

The monitoring apparatus 17 according to the invention may monitor a zone 19 independently of the direction of conveyance of a workpiece carrier 21. Such an operation is described below, for example, for monitoring the transfer location 16. For this purpose, the monitoring apparatus 17 is positioned externally of an outer conveying section 18 of the main conveyor 12 in an outgoing zone 19 of the transfer location 16. The monitoring apparatus 17 is further arranged such that its face is oriented from a side path toward an outer conveying section 57 of the feed-in path 14 of the feed-in module 13. The monitoring apparatus 17 extends in the conveying direction 61 at least partially over the outer conveyor path portion 57. The monitoring apparatus 17 may be coupled with a non-illustrated separating element which is arranged upstream of the transfer location 16 relative to the main conveyor 12. The separating element may be situated at a distance from the main conveyor 12 in front of the transfer location 16 to ensure that a workpiece carrier 21, held back by a separating element, is positioned at a distance from a workpiece carrier 21 situated in the transfer location 16 so that no collision between the workpiece carriers may take place.

In the operational description which follows, it is assumed that a separating element is arranged in the main conveyor 12. The separating element is moved into a stopping position so that no further workpiece carrier 21 may be fed into the transfer location 16 because a workpiece carrier 21 present in the feed-in module 13 is to be advanced to the main conveyor 12.

After the workpiece carrier 21 has been moved into the transfer location 16, such a position is detected by the monitoring apparatus 17. At the same time, the monitoring apparatus 17 serves as a stop so that the workpiece carrier 21 is arrested in its transport motion after it has been fed into the transfer location 16. Thus, the monitoring apparatus 17 performs a dual function as it monitors the transfer location 16. First, it serves as a stop and second, it recognizes whether a workpiece carrier 21 is present in the transfer location 16.

After the workpiece carrier 21 has been detected in the transfer location 16, the monitoring apparatus 17 transmits a signal to a transverse stroke unit 58 which is lowered as a result. After the latter has reached a lower position, the workpiece carrier 21 is placed on the main conveyor 12 and is moved out of the transfer location 16 in the principal transport direction 61. During the feed-out of the workpiece carrier 21 from the transfer location 16, an edge 33 of the workpiece carrier 21 engages the switching element 34 and holds the same in its switching position 41. By virtue of the length of the switching element 34 which extends at least with a short section over the outer conveyor portion 57 in the transporting direction 61, it may be ensured that the switching element 34, after the workpiece carrier 21 has been fully moved out of the transfer location 16, is shifted from the switching position 41 into the position of rest 38 by the resetting means 47 and it detects the absence of the workpiece carrier 21 in the transfer location 16.

In this manner, the transfer location 16 may be monitored by a monitoring apparatus 17 which may detect the occurrence when a workpiece carrier 21 has been moved into the transfer location 16 and thus may monitor the presence and the removal of a workpiece carrier 21.

The monitoring apparatus 17 may also be arranged at additional transfer locations which are formed, for example, by a main conveyor with a feed-out module, a feed-out module and a side conveyor or a side conveyor and a feed-in module.

In the alternative, the transfer location 16 may have a monitoring apparatus 17 without being associated with a separating element.

As another alternative or in addition, a monitoring apparatus 17 may monitor the presence of a workpiece carrier 21 in the region of a conveyor section of the conveyor system. In such an application, the extent of the monitored zone is determined by twice the length of an edge 33 of the workpiece carrier 21 and the length of a switching face 54 which is part of the switching element 34 and which extends parallel to the conveying direction. The switching element 34 has a run-up ramp 53 to ensure a simple actuation of the switching element 34 upon arrival of the workpiece carrier 21 into the zone to be monitored. In this manner, the switching element 34 may be first exposed to a turning motion which, as a function of the fine adjustment of a signal transmitter 48 relative to the switching means 52 of the switching element 34 may already detect the presence of a workpiece carrier 21. Thereafter the switching element 34 is guided substantially parallel to the edge 33 of the workpiece carrier 21 into the switching position 41 and is maintained therein.

By so designing a left and right-hand end of the switching element 34 that it at least partially extends into the conveyor, the monitoring apparatus 17 may find application independently of the conveying direction.

In the alternative, the switching element 34 may be moved by other arrangements from its position of rest 38 into its switching position 41 to actuate a signal transmitter 48.

It will be understood that the above description of the present invention is susceptible to various modifications, changes and adaptations, and the same are intended to be comprehended within the meaning and range of equivalents of the appended claims.

What is claimed is:

1. A transporting system comprising
   (a) a conveyor;
   (b) a workpiece carrier adapted to be advanced by said conveyor; and
   (c) a monitoring apparatus for monitoring a presence or absence of said workpiece carrier in a predetermined zone of said conveyor; said monitoring apparatus including
      (1) a housing;
      (2) a switching element supported adjacent said conveyor and projecting at least partially into a path of said conveyor; said switching element having
         (i) a central axis oriented parallel to a direction of displacement of said switching element; and
         (ii) two apertures being spaced from said central axis;
      (3) means for actuating said switching element independently of a direction of conveyance of said workpiece carrier;
      (4) means for guiding said switching element in said housing for a displacement between a position of rest and a switching position in a plane of conveyance of said workpiece carrier;
      (5) resetting means for urging said switching element into said position of rest; said resetting means comprising a compression spring arranged in an axial alignment with said central axis; and
      (6) a separate guiding device affixed to said switching element and received in a respective said aperture to be guided thereby.

2. The transporting system as defined in claim 1, wherein said switching element is a slide member; further wherein said slide member has a run-up ramp facing partially in a direction opposite to a conveying direction of said workpiece carrier.

3. The transporting system as defined in claim 1, wherein each said aperture is a slot.

4. The transporting system as defined in claim 1, wherein each said guiding device is a cylindrical pin.

5. The transporting system as defined in claim 1, further comprising means for linearly guiding said switching element in said housing.

6. The transporting system as defined in claim 1, further comprising means for rotatably guiding said switching element in said housing.

7. The transporting system as defined in claim 1, wherein said monitoring apparatus further comprises a signal transmitter supported adjacent said switching element such that said signal transmitter emits a signal when said switching element is in said switching position in response to a presence of said workpiece carrier at a location of said conveyor monitored by said monitoring apparatus.

8. The transporting system as defined in claim 7, wherein said signal transmitter is one of an inductive, capacitive, optical and mechanical sensor.

9. The transporting system as defined in claim 7, further comprising means for adjusting said signal transmitter relative to said switching element for varying a sensitivity of said signal transmitter.

10. The transporting system as defined in claim 7, wherein said switching element is a plastic member; further comprising a switching means carried by said plastic member; said signal transmitter responding to a presence of said switching means.

11. The transporting system as defined in claim 10, wherein said switching means comprises a metal insert.

12. The transporting system as defined in claim 1, wherein at least one part of said switching element extends transversely into a path of said conveyor, whereby a part of said workpiece carrier, transported by said conveyor, displaces said switching element into a switching position.

13. The transporting system as defined in claim 1, wherein said monitoring apparatus further comprises securing means carried by said housing for attaching said housing to a component of said conveyor.

* * * * *